Feb. 2, 1954  F. H. McCORMICK  2,668,221
DOMESTIC APPLIANCE
Filed July 16, 1949  3 Sheets-Sheet 1

INVENTOR.
Francis H. McCormick
BY
Spence Hardman & John
Attorneys

Feb. 2, 1954
F. H. McCORMICK
2,668,221
DOMESTIC APPLIANCE
Filed July 16, 1949
3 Sheets-Sheet 2
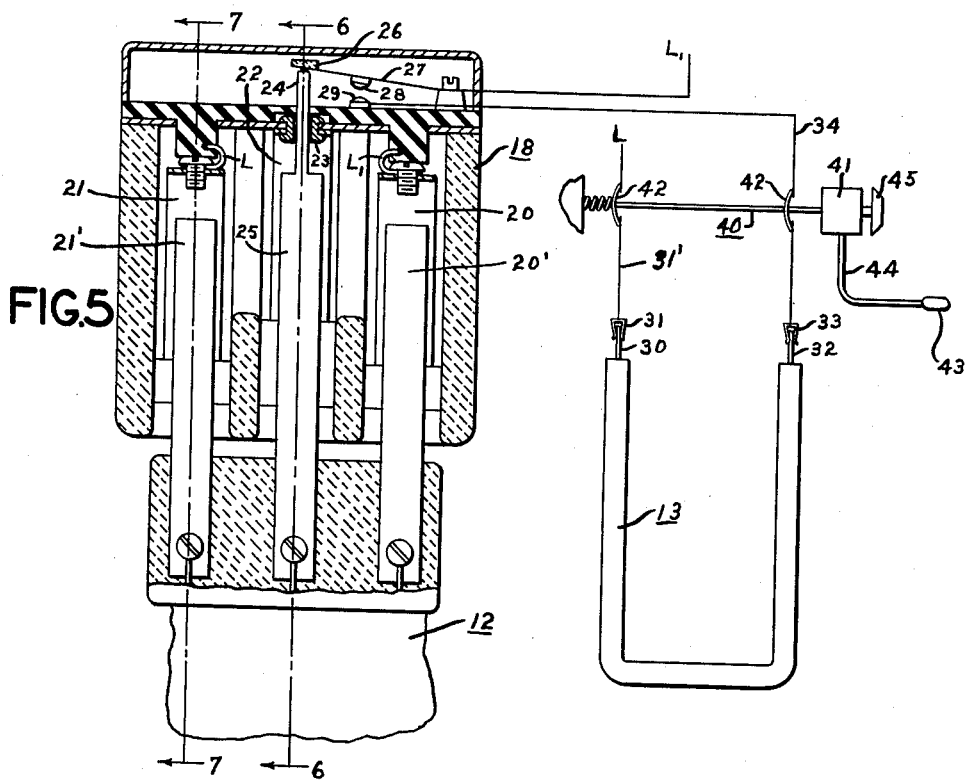
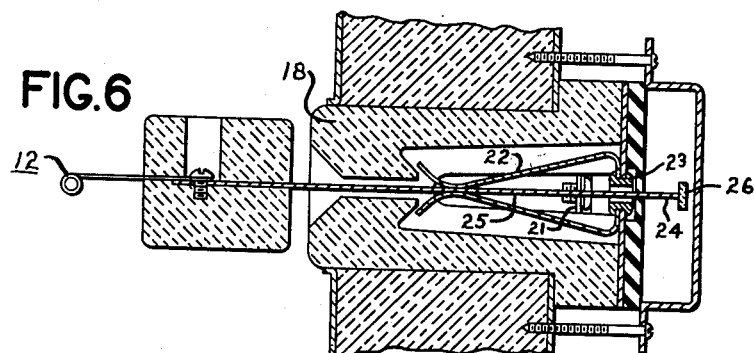
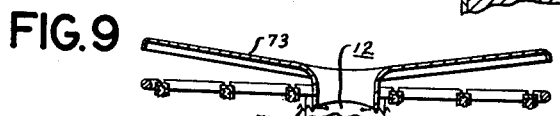
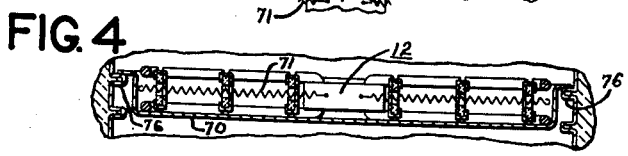
INVENTOR.
Francis H. McCormick
BY
Spencer Hardman & John
Attorneys Feb. 2, 1954

F. H. McCORMICK 2,668,221

DOMESTIC APPLIANCE

Filed July 16, 1949

INVENTOR.
Francis H. McCormick
BY
Spencer Hardman & John
Attorneys

Patented Feb. 2, 1954

2,668,221

UNITED STATES PATENT OFFICE 2,668,221

DOMESTIC APPLIANCE

Francis H. McCormick, Oakwood, Ohio, assignor to General Motors Corporation, Dayton, Ohio, a corporation of Delaware Application July 16, 1949, Serial No. 105,105

19 Claims. (Cl. 219—35)

This invention relates to domestic appliances and more particularly to electric ranges.

My invention is an improvement over previous domestic electric ovens, in that two independent and dissimilar cooking operations such as broiling and baking may be performed in the single oven heretofore used on domestic electric ranges. Also, when necessary, my improved oven may be adjusted to receive relatively large roasts such as fowls which require a relatively large cooking compartment.

Accordingly, my improved domestic range oven is provided with upper, intermediate and lower heaters arranged to produce two compartments closed by a single door and adapted to cook foods under independent conditions. The intermediate heater may be removed from its intermediate position to provide a single relatively large compartment capable of cooking relatively large roasts. The two compartments are controlled by two independent thermostats, one of which is used to control the single large compartment. The single door is constructed to open and close both compartments, and, if desired, to close one compartment while partially opening the other. Preferably the upper compartment is arranged for baking, roasting and broiling, while the lower compartment may be used for baking or warming.

An object of this invention is to provide an oven having three or more spaced heaters to produce two or more independent food heating spaces therebetween, with the intermediate heater movable to provide a single relatively large compartment.

Another object of this invention is to provide an oven having upper, intermediate and lower heaters for said oven to produce two independent food heating spaces therebetween, with power controls for said heaters effective to produce independent cooking conditions in the two spaces when the intermediate heater is in its central position, and effective to provide a unitary control when the intermediate heater is moved to provide a single relatively large compartment.

Another object of this invention is to provide upper, intermediate and lower heaters for an oven to produce two food heating spaces therebetween, with the intermediate heater being movable to a lower position to produce a relatively large food heating space, capable of receiving large articles to be cooked.

Another object of this invention is to provide upper, intermediate and lower heaters, with thermostatic controls such that the upper space may be thermostatically controlled independently of the lower space.

Another object of this invention is to provide an oven with upper, intermediate and lower heaters, with the intermediate heater being movable from a relatively central position to a lower position adjacent the lower heater, with thermostatic controls and power connections such that a thermostat controls the upper and intermediate heaters and another thermostat controls the lower heater, the power to the lower heater being open circuited when the intermediate heater is in the lower position.

Another object of this invention is to provide an oven with upper, intermediate and lower heaters and with a door having a closed position, a slightly ajar position, and a fully open position. The door is effective to close both spaces when in closed position, to close one space and slightly open another space when in the slightly ajar position, and to open both spaces when in the fully open position.

Another object of this invention is to provide an intermediate heater with a resistance element and a substantially imperforate partition extending below said resistance element substantially throughout the horizontal extent of the oven to form two thermally separated spaces in the oven.

Further objects and advantages of the present invention will be apparent from the following description, reference being had to the accompanying drawings, wherein a preferred form of the present invention is clearly shown.

In the drawings:

Fig. 4 is a vertical cross-section taken along the line 4—4 of Fig. 1;

Fig. 5 is an enlarged cross-sectional view of a power connector for use with the intermediate heater at its lower position, and showing connections with the lower heater;

Fig. 6 is a vertical cross-section along the line 6—6 of Fig. 5;

Fig. 9 is a view similar to Fig. 4, showing additionally the baffle which may be used above the resistance.

My invention may include an oven 10, having upper, intermediate and lower heaters 11, 12 and 13, respectively, to form food cooking spaces 14 and 15 above and below the intermediate heater. These food cooking spaces 14 and 15 are capable of maintaining different temperatures and different conditions of heating, so that baking, broiling and/or warming may be accomplished simultaneously and independently within the two cooking spaces in the oven.

Figure 1:
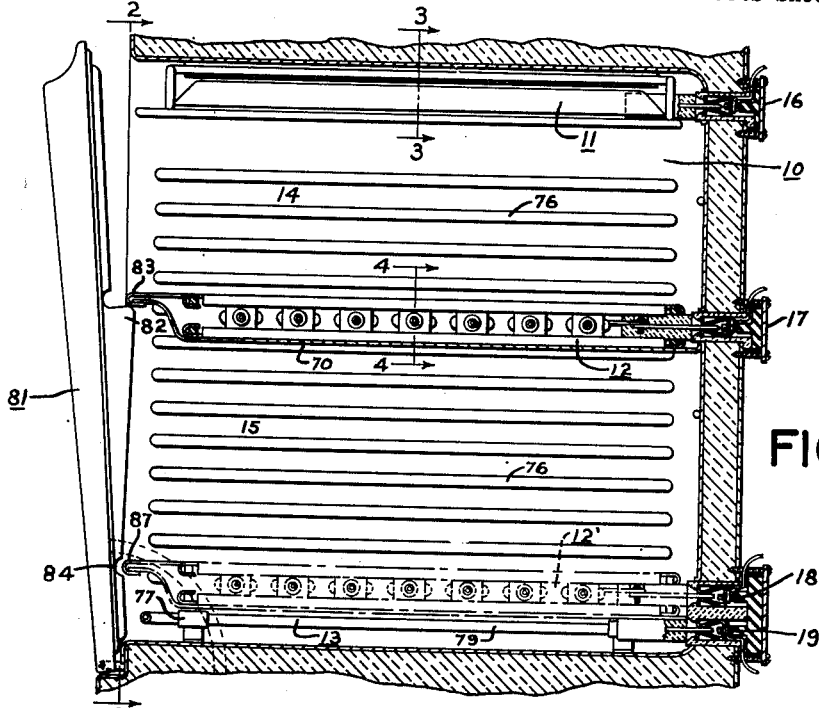
Fig. 1 is a vertical cross-section, along the line 1—1 of Fig. 2, showing an oven embodying features of my invention.
Figure 2:
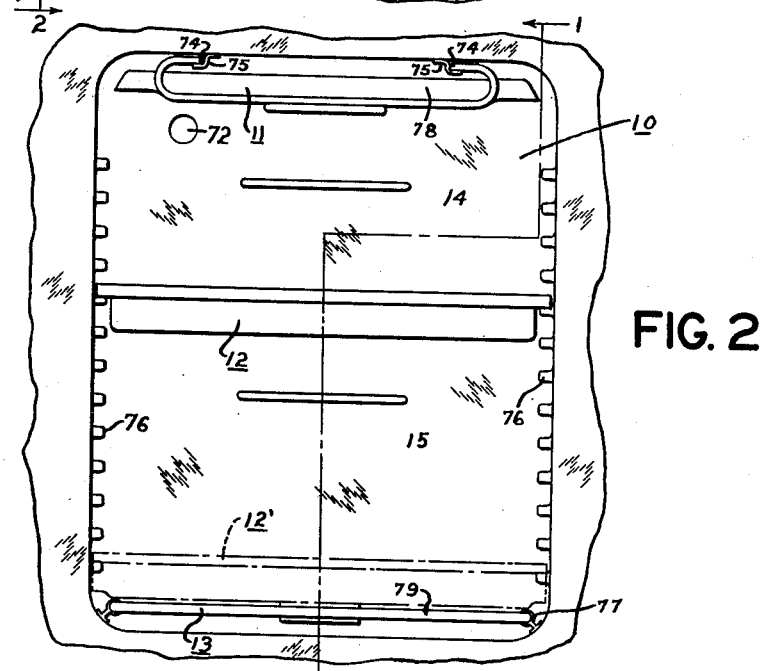
Fig. 2 is a vertical cross-section taken along the line 2—2 of Fig. 1.
Figure 3:
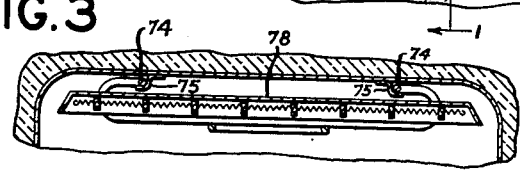
Fig. 3 is a vertical cross-section taken along the line 3—3 of Fig. 1.

The intermediate heater 12 is movable from a relatively central position, as indicated in full lines in Fig. 1, to a lower position 12', as indicated in dotted lines in Fig. 1. The lower position preferably is adjacent the lower heater 13, to form a single large compartment substantially equal in volume to the previous separate compartments 14 and 15, and capable of roasting a large turkey or the like.

Power connectors 16, 17, 18, and 19 are provided. Connectors 16 and 19 provide power for the upper and lower heaters 11 and 13 respectively. They may be of any suitable bayonet type which allow the heaters to be removed for cleaning, repairing and the like. The connectors 17 and 18 are somewhat similar to connectors 16 and 19; but are provided with means effective to allow all three heaters to be energized when heater 12 is in its relatively central position, and effective to energize only the upper heater 11 and the intermediate heater 12, and to disconnect lower heater 13, when the intermediate heater is in its lower position.

Figures 7, 8:
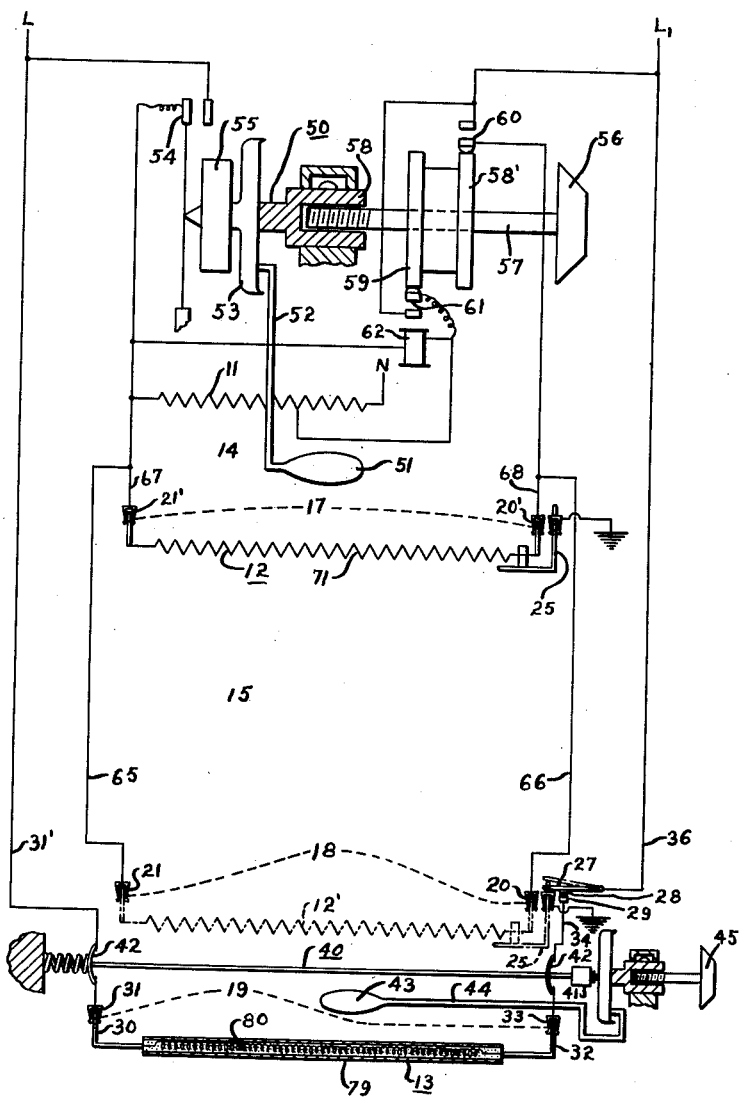
Fig. 7 is a vertical cross-section along the line 7—7 of Fig. 5.
Fig. 8 is a wiring diagram showing the connections and controls for the heaters.

In order to allow the intermediate heater 12 to control the connections to the lower heater 13, the connector 18 may be constructed as shown in Figs. 5, 6 and 7, and may include the power line bayonet slots 20 and 21 and the neutral bayonet slot 22. The slots 20 and 21 may be connected to the power lines $L_1$ and L and receive the power prongs 20' and 21' of heater 12 while the connector 22 may be connected to the neutral wire or to ground as is usual and receives the ground prong 25 of the heater 12. In addition, the neutral connector 22 is provided with an insulated opening 23 through which the extension 24 of the heater ground prong 25 may project. The extension 24 is adapted to engage an insulated cap 26 of a switch blade 27, and to open the contacts 28, 29, which are adapted to close when the prong 25 is removed. Thus the lower heater is disconnected at contacts 28 and 29 when the intermediate heater is in its lower position; but is connected when the intermediate heater is removed from its lower position.

One of the prongs 30 of the lower heater 13 is connected to the line L through the medium of bayonet slot 31, thermostat contact 42, and line 31'. The other prong 32 is connected to the line L, through the bayonet slot 33, thermostat contact 42, line 34, contacts 29, 28, blade 27 and line 36. Thus, when the heater 12 is inserted in the connector 18, the power connection to the lower heater 13 is broken by the opening of contacts 29 and 29; but when the heater 12 is removed from the connector 18, and is inserted in the connector 17, the lower heater 13 is connected to the power line $L_1$ by the closing of contacts 28 and 29.

The lower heater 13 is controlled by a thermostatic switch 40 which may include the usual snap-acting mechanism 41 capable of opening and closing the contacts 42 in response to temperature variation within the space 15. These variations act upon the bulb 43, connected by the tube 44 with the snap-acting mechanism 41, as is well known. The mechanism 41 may be adjusted by the knob 45, capable of adjusting the mechanism to be responsive to various temperatures, as selected by the setting of the knob 45, and capable of maintaining the contacts 42 fully open in the "off" position, regardless of oven and room temperatures.

Thermostatic means 50 for controlling the temperature within the space 14 may also be provided, and this may include a thermostatic construction substantially identical with that disclosed in patent to M. E. Fry, No. 2,388,839, granted Nov. 13, 1945. Briefly stated, it may include a thermostatic bulb 51 connected by tube 52 to a diaphragm or bellows 53, which opens and closes the contact 54 by a snap-acting mechanism 55. The temperature setting may be adjusted by means of knob 56 connected to a shaft 57 which has a threaded connection with the sleeve 58 axially to adjust the bellows 53. The knob 56 may have an "off" position, a "broil" position, and a plurality of temperature positions, which are the "bake" positions. The highest temperature is the "broil" position. The shaft 57 is provided with selector cams 58 and 59, which open and close the contacts 60 and 61 at proper settings of the knob 56. In the "off" position contacts 60, 61 and 54 are open. In the "broil" position contacts 61 and 54 are closed, and contacts 60 are open. This energizes the upper heater 11 at full capacity, as described in the Fry patent. If the knob 56 is turned to any of the temperature positions, except the broil position, the contacts 54 and 60 are closed, and the contacts 61 are open, thus energizing the intermediate heater 12 at full capacity, and the upper heater 11 at reduced output, these heaters being subsequently cycled by the thermostatic opening and closing of the contacts 54 in response to temperatures acting on the bulb 51. If the knob 56 is first turned to broil, and then back to some baking position, the upper heater 11 and intermediate heater 12 are both energized at full capacity until the space 14 reaches the desired temperature. This is accomplished by the closing of contacts 54 and 61 in the broil position, the contacts 61 being maintained closed by the holding solenoid 62 after the knob 56 is moved to the bake position, the contacts 60 being closed in the bake position. Therefore, for one heating cycle, both heaters 11 and 12 are at full capacity, the cycle being terminated by the opening of contacts 54, which opening deenergizes the solenoid 62 and allows the heater 11 thereafter to be re-energized at reduced output, with the other heater at full capacity, as more fully described in the Fry patent.

When the intermediate heater 12 is removed from its central position, and inserted in its lower position, the prong 25 moves the switch blade 27 to open position, thus disconnecting the lower heater 13 from the power line $L_1$. The thermostat 50 continues to control the intermediate heater 12 exactly the same as it did in its central position, by virtue of the lines 65 and 66 which connect the slots 20 and 21 to the thermostatic control 50 exactly the same as the lines 67 and 68 connect the bayonet slots 20' and 21' of the intermediate connector 17.

Preferably the intermediate heater 12 is provided with an imperforate partition 70 extending below the resistance element 71 substantially throughout the horizontal extent of the oven, to form the two substantially thermally separated spaces, 14 and 15. Some slight opening (not shown) may be provided in the partition 70 which is only sufficiently large to allow the vapors to flow through said opening from the compartment 15 to the compartment 14, from whence they may flow through the vent 72, which vent may be of the usual construction. This opening should not be sufficiently large to provide any substantial thermal exchange.

If desired, the intermediate heater 12 may be provided with a distributing baffle 73 above the resistance element 71 as indicated in Fig. 9, which baffle may be substantially identical with the baffle 60 disclosed in my Patent 2,314,592, granted March 23, 1943.

The heaters may be supported by any suitable means. Thus the upper heater 11 may include longitudinal wire bars 74 slidable in brackets 75, which are supported at the top of the oven. The intermediate heater 12 may be supported on various shelf brackets 76 formed in the sides of the oven, for reception of shelves, heaters, and the like, these being properly located for reception of the heater 12 both in its central and lower positions. The lower heater 13 may be slidably supported on longitudinal brackets 77.

The upper heater may be provided with a reflector 78, to reflect the rays downwardly.

The lower heater may be formed of an outer tube 79 within which is placed the resistance 80, embedded in impacted insulation, a well known construction.

The door 81 has a fully closed position, a slightly ajar position, and a fully open position. The mounting, hinging and supporting of the door may be of any well known construction, for example, such as is disclosed in my Patent 2,308,768, granted June 19, 1943. The door lining may be provided with a bulging portion 82 adapted to cooperate with the front lip 83 of the partition 70 of the heater 12 in such a manner that, when the door is in the slightly ajar position, as illustrated in Fig. 1, the compartment 15 is substantially closed, while the compartment 14 is maintained slightly open. Under these conditions, the compartment 14 may be used for broiling, and the temperature within the compartment is thus prevented from rising sufficiently to cycle the contacts 54. At the same time the compartment 15 may be used for baking or warming, because of its substantially closed condition, produced by the bulge 82 and lip 83. When the door 81 is in its fully open position, which may be substantially horizontal, both compartments 14 and 15 are fully open, as is evident. When the door 81 is in its fully closed position, with its upper part substantially against the upper edge of the oven, then both compartments 14 and 15 are substantially closed, under which conditions either or both of the compartments may be used for either baking or warming, as desired. The bulging portion 82 extends laterally substantially from one side wall of the oven to the other side wall, to substantially seal the compartment 15 when the door is slightly ajar.

In the operation of my invention, if it is desired to broil in the compartment 14, while simultaneously baking and/or warming in the compartment 15, with the intermediate heater in central position, the knob 56 is turned to "broil," and the knob 45 is turned to the desired baking or warming temperature. The article to be broiled is placed on a shelf (not shown) within the compartment 14, while the article to be baked is placed on a shelf (not shown) within the compartment 15. The door 81 is placed in the slightly ajar position, as shown in Fig. 1. If it is desired to remove or insert articles in either of the compartments 14 or 15, the door 81 is placed in its fully open position. If it is desired to bake and/or warm in both of the compartments 14 and 15, the knobs 56 and 45 are adjusted to the desired baking conditions, articles are placed in both compartments 14 and 15, and the door 81 is placed in its fully closed position.

Should it be desired to cook a very large article, the intermediate heater 12 is moved to its lower position, and the knob 56 is adjusted to the desired condition. The article is supported on proper shelving (not shown) at the desired elevation, and the door 81 is placed either in the slightly ajar position shown in Fig. 1, for broiling or in the fully closed position for baking, roasting or warming, the notch 84 in the door permitting it to be fully closed without abutting against the lip 83. Under such conditions heaters 11 and 12 are controlled by thermostat 50.

A companion application for Domestic Appliance (S. N. 105,106), showing and claiming a modification of this invention is filed (July 16, 1949) concurrently herewith.

My application S. N. 213,721, filed March 3, 1951, which contains claims including door construction, is a continuation-in-part of this application. This application is also related to S. N. 218,413, filed March 30, 1951, which is a continuation-in-part of S. N. 105,106.

It is obvious that either of the compartments 14 and 15 may be used alone, without using the other compartment, if desired.

While the form of embodiment of the invention as herein disclosed, constitutes a preferred form, it is to be understood that other forms might be adopted, as may come within the scope of the claims which follow.

What is claimed is as follows:

1. In combination: an oven; an upper heater in the upper part of said oven; a lower heater in the lower part of said oven; an intermediate heater in said oven intermediate said upper and lower heaters and movable from a relatively central position to a lower position adjacent said lower heater; power connections for said heaters effective to energize all of said heaters when said intermediate heater is in its central position and effective to energize only said upper and intermediate heaters when said intermediate heater is in its lower position; a thermostat controlling said upper and intermediate heaters and having a single knob effective to energize said upper heater at full capacity when in broil position, to energize said intermediate heater at full capacity and said upper heater at reduced output in bake position and to disconnect said upper and intermediate heaters in off position; and another thermostat controlling said lower heater.

2. In combination: an oven; an upper heater in the upper part of said oven; a lower heater in the lower part of said oven; an intermediate heater in said oven intermediate said upper and lower heaters and movable from a relatively central position to a lower position adjacent said lower heater; power connections for said heaters effective to energize all of said heaters when said intermediate heater is in its central position and effective to energize only said upper and intermediate heaters when said intermediate heater is in its lower position; and a thermostat controlling said upper and intermediate heaters and having a single knob effective to energize said upper heater at full capacity when in broil position, to energize said intermediate heater at full capacity and said upper heater at reduced output in bake position, to energize said upper and intermediate heaters at full capacity when turned to broil position and then to a bake position, and to disconnect said upper and intermediate heaters in off position.

3. In combination: an oven; an upper heater in the upper part of said oven; a lower heater in the lower part of said oven; an intermediate heater in said oven intermediate said upper and lower heaters and movable from a relatively central position to a lower position adjacent said lower heater; power connections for said heaters effective to energize all of said heaters when said intermediate heater is in its central position and effective to energize only said upper and intermediate heaters when said intermediate heater is in its lower position; and a thermostat controlling said upper and intermediate heaters and having a single knob effective to energize said upper heater at full capacity when in broil position, to energize said intermediate heater at full capacity and said upper heater at reduced output in bake position, to energize said upper and intermediate heaters at full capacity when turned to broil position and then to a bake position and to disconnect said upper and intermediate heaters in off position; and another thermostat controlling said lower heater.

4. In combination: an oven; first, second and third heaters in said oven; means holding said second heater in two positions; an oven thermostat controlling only said first and second heaters; another oven thermostat controlling only said third heater; and means effective when said second heater is in one position for preventing energization of said third heater and for permitting energization of said third heater when said second heater is in the other position.

5. In combination: an oven; upper, intermediate and lower heaters in said oven spaced to provide two independent cooking compartments above and below said intermediate heater, door means including a common door extending as a rigid continuous impervious unit over the entire front of both compartments and operable to open and close both said compartments; two independent oven thermostats independently controlling said heaters to produce independent cooking conditions in said compartments, and means for moving said intermediate heater to provide a single relatively large cooking compartment, said door means having means for fully closing one compartment while slightly opening the other compartment.

6. An oven selectively capable of selective simultaneous baking and broiling operations and two separate independent simultaneous baking operations including an enclosure enclosing an oven compartment provided with a door, a broil type top independent electric heating unit at the top of the oven compartment, a bottom independent electric heating unit at the bottom of the oven compartment, an intermediate independent electric heating unit intermediate the top and bottom of the oven compartment, a horizontal dividing partition immediately below the intermediate heating unit dividing said oven compartment into upper and lower sub-compartments, a first cycling thermostatic means substantially entirely responsive to temperatures in the upper sub-compartment for connecting and disconnecting only said top and intermediate heating units, and a second separate and independent cycling thermostatic means substantially entirely responsive to temperatures in the lower sub-compartment for connecting and disconnecting only said bottom heating unit said first thermostatic means and said top and intermediate units being connected in parallel electric circuit relationship with said second thermostatic means and said bottom heating unit.

7. An oven selectively capable of selective simultaneous baking and broiling operations and two separate independent simultaneous baking operations including an enclosure enclosing an oven compartment provided with a door, a broil type top independent electric heating unit at the top of the oven compartment, a bottom independent electric heating unit at the bottom of the oven compartment, an intermediate independent electric heating unit intermediate the top and bottom of the oven compartment, a receptacle at the rear of the oven enclosure immediately adjacent the rear of said intermediate heating unit for conducting electric energy to said intermediate unit, a second receptacle at the rear adjacent the bottom of the oven enclosure capable of making an electrical connection with the intermediate heating unit when the intermediate heating unit is transferred to a position at the bottom of the oven enclosure, and switch means provided in connection with one of said receptacles for preventing the energization of said lower heating unit.

8. An oven selectively capable of selective simultaneous baking and broiling operations and two separate independent simultaneous baking operations including an enclosure enclosing an oven compartment provided with a door, a broil type top independent electric heating unit at the top of the oven compartment, a bottom independent electric heating unit at the bottom of the oven compartment, an intermediate independent electric heating unit intermediate the top and bottom of the oven compartment, a receptacle at the rear of the oven enclosure immediately adjacent the rear of said intermediate heating unit for conducting electric energy to said intermediate unit, a second receptacle at the rear adjacent the bottom of the oven enclosure capable of making an electrical connection with the intermediate heating unit when the intermediate heating unit is transferred to a position at the bottom of the oven enclosure, and switch means operable coincidental to the transfer of said intermediate unit from its intermediate position to its lower position for preventing the energization of said lower heating unit.

9. An electric oven including an enclosure enclosing an oven compartment provided with a door, a broil type top independent electric heating unit at the top of the oven compartment, a bottom independent electric heating unit at the bottom of the oven compartment, a horizontal independent intermediate electric heating unit having an intermediate heating position intermediate the top and bottom of the oven compartment and having a lower heating position at the bottom of the oven compartment, and switch means effective coincidentally to the transfer of said intermediate unit from its intermediate position to its lower position for preventing the energization of said lower heating unit.

10. An electric oven including an enclosure enclosing an oven compartment provided with a door, a broil type top independent electric heating unit at the top of the oven compartment, a bottom independent electric heating unit at the bottom of the oven compartment, the back wall of said oven enclosure being provided with a first electrical receptacle at a location intermediate the top and bottom of the oven enclosure and a second electrical receptacle adjacent the bottom of the oven enclosure, a horizontal intermediate independent electric heating unit having electrical prong connector adapted to fit said first and second receptacles, one of said receptacles being provided with means controlled by the prong connector of said intermediate unit for controlling the energization of said lower unit.

11. An electric oven including an enclosure enclosing an oven compartment provided with a door, a broil type top independent electric heating unit at the top of the oven compartment, a bottom independent electric heating unit at the bottom of the oven compartment, the back wall of said oven enclosure being provided with a first electrical receptacle at a location intermediate the top and bottom of the oven enclosure and a second electrical receptacle adjacent the bottom of the oven enclosure, a horizontal intermediate independent electric heating unit having electrical prong connector adapted to fit said first and second receptacles, one of said receptacles being provided with means responsive to the transfer of the prong connector from the first receptacle to the second receptacle for preventing the energization of said lower unit.

12. An electric oven including an enclosure enclosing an oven compartment provided with a door, a broil type top independent electric heating unit at the top of the oven compartment, a bottom independent electric heating unit at the bottom of the oven compartment, the back wall of said oven enclosure being provided with a first electrical receptacle at a location intermediate the top and bottom of the oven enclosure and a second electrical receptacle adjacent the bottom of the oven enclosure, a horizontal intermediate independent electric heating unit having electrical prong connector adapted to fit said first and second receptacles, one of said receptacles being provided with a switch means connected in series with said bottom heating unit, the prong connector of said intermediate unit having means for operating said switch means when inserted into said one receptacle.

13. An electric oven including an enclosure enclosing an oven compartment provided with a door, a broil type top independent electric heating unit at the top of the oven compartment, a bottom independent electric heating unit at the bottom of the oven compartment, the back wall of said oven enclosure being provided with a first electrical receptacle at a location intermediate the top and bottom of the oven enclosure and a second electrical receptacle adjacent the bottom of the oven enclosure, a horizontal intermediate independent electric heating unit having electrical prong connector adapted to fit said first and second receptacles, one of said receptacles being provided with a switch means connected in series with said bottom heating unit, the prong connector of said intermediate unit having projecting means for engaging and operating said switch means when this connector is inserted into said one receptacle.

14. An electric oven including an enclosure enclosing an oven compartment provided with a door, a broil type top independent electric heating unit at the top of the oven compartment, a bottom independent electric heating unit at the bottom of the oven compartment, the back wall of said oven enclosure being provided with a first electrical receptacle at a location intermediate the top and bottom of the oven enclosure and a second electrical receptacle adjacent the bottom of the oven enclosure, a horizontal intermediate independent electric heating unit having electrical prong connector adapted to fit said first and second receptacles, one of said receptacles being provided with a switch means connected in series with said bottom heating unit, the prong connector of said intermediate unit having means for operating said switch means when inserted into said one receptacle, a first thermostatic switch means having its thermosensitive element located in the portion of the oven compartment above the level of said first receptacle and having its thermostatically controlled contacts electrically connected in series with said broil unit and both of said receptacles, and a second thermostatic switch means having its thermosensitive element located in the portion of the oven compartment below the level of said first receptacle and having its thermostatically controlled contacts connected in series with said bottom unit, said second thermostatic switch means and said bottom unit being connected in parallel electric circuit relationship to said first thermostatic switch means and said broil unit and said receptacles.

15. An electric oven including an enclosure enclosing an oven compartment provided with a door, a broil type top independent electric heating unit at the top of the oven compartment, a bottom independent electric heating unit at the bottom of the oven compartment, the back wall of said oven enclosure being provided with a first electrical receptacle at a location intermediate the top and bottom of the oven enclosure and a second electrical receptacle adjacent the bottom of the oven enclosure, a horizontal intermediate independent electric heating unit having electrical prong connector adapted to fit said first and second receptacles, said intermediate unit when fitted into said first receptacle dividing said oven compartment into upper and lower sub-compartments, a first thermostatic switch means having its thermosensitive element located in heat exchange relation with said upper sub-compartment and having its contacts connected in series with said upper unit and said receptacles, and a second thermostatic switch means having its thermosensitive element located in heat exchange relation with said lower sub-compartment and having its contacts connected in series with said bottom unit, said bottom unit and said second switch means being connected in electrical parallel circuit relationship with respect to said first switch means and said upper unit and said receptacles.

16. An oven selectively capable of selective simultaneous baking and broiling operations and two separate independent simultaneous baking operations including an enclosure enclosing an oven compartment provided with a door, a broil type top independent electric heating unit at the top of the oven compartment, a bottom independent electric heating unit at the bottom of the oven compartment, an intermediate independent electric heating unit intermediate the top and bottom of the oven compartment, a horizontal dividing partition adjacent said intermediate heating unit dividing said oven compartment into upper and lower sub-compartments, a first thermostatic means substantially entirely responsive to temperatures in the upper sub-compartment in which intermediate unit is located for controlling said top and intermediate units, and a second separate and independent thermostatic means substantially entirely responsive to temperatures in the lower sub-compartment for controlling said bottom heating unit, an adjusting means for said first thermostatic means, and switch means having a broil position connecting said broil unit at full output and disconnecting said intermediate unit and having a bake position connecting said intermediate unit at full output and said broil unit at reduced output.

17. An oven selectively capable of selective simultaneous baking and broiling operations and two separate independent simultaneous baking operations including an enclosure enclosing an oven compartment provided with a door, a broil type top independent electric heating unit at the top of the oven compartment, a bottom independent electric heating unit at the bottom of the oven compartment, an intermediate independent electric heating unit intermediate the top and bottom of the oven compartment, a horizontal dividing partition adjacent said intermediate heating unit dividing said oven compartment into upper and lower sub-compartments, a first thermostatic means substantially entirely responsive to temperatures in the upper sub-compartment in which intermediate unit is located for controlling said top and intermediate units, and a second separate and independent thermostatic means substantially entirely responsive to temperatures in the lower sub-compartment for controlling said bottom heating unit, an adjusting means for said first thermostatic means, and switch means having a broil position connecting said broil unit at full output and disconnecting said intermediate unit and having a bake position connecting said intermediate unit at full output and said broil unit at reduced output, said adjusting means having means for operating said switch means to said broil and bake positions.

18. An electric oven including an enclosure enclosing an oven compartment provided with a door, a broil type top independent electric heating unit at the top of the oven compartment, a bottom independent electric heating unit enclosed within a tubular sheath located substantially in a single horizontal plane at the bottom of the oven compartment, the back wall of said oven enclosure being provided with a first electrical receptacle at a location intermediate the top and bottom of the oven enclosure and a second electrical receptacle adjacent the bottom of the oven enclosure, a horizontal intermediate independent electric heating unit having an electrical connection adapted to fit said first and second receptacles, said intermediate unit being provided with a substantially impervious horizontal partition beneath and a distributing baffle above.

19. In combination, an oven, an independent bottom electric heater at the bottom of said oven, a removable independent intermediate electric heater at an intermediate position within said oven intermediate the bottom and top of said oven dividing the oven into upper and lower sub-compartments, a receptacle at the rear of the oven immediately adjacent the rear of said intermediate heater for conducting electric energy to said intermediate heater, a second receptacle at the rear of the oven capable of making an electrical connection with the intermediate heater when the intermediate heater is transferred to a second position in the oven, switch means provided in connection with one of said receptacles for preventing the energization of said lower heater, said intermediate heater being provided with means for operating said switch means when transferred from one position to another.

FRANCIS H. McCORMICK.

References Cited in the file of this patent

UNITED STATES PATENTS

| Number | Name | Date |
|---|---|---|
| 1,118,454 | Weeks | Nov. 24, 1914 |
| 1,375,801 | Ross | Apr. 26, 1921 |
| 1,530,007 | Moore et al. | Mar. 17, 1925 |
| 1,580,283 | Corbett | Apr. 13, 1926 |
| 1,637,435 | Brown | Aug. 2, 1927 |
| 2,146,427 | Hawkins | Feb. 7, 1939 |
| 2,196,035 | Shaw | Apr. 2, 1940 |
| 2,237,808 | Berg | Apr. 8, 1941 |
| 2,276,930 | Clark | Mar. 17, 1942 |
| 2,388,839 | Fry | Nov. 13, 1945 |
| 2,408,295 | Cossin | Sept. 24, 1946 |
| 2,415,768 | Shaw | Feb. 11, 1947 |
| 2,434,467 | McCormick | Jan. 13, 1948 |
| 2,442,900 | McCormick | June 8, 1948 |
| 2,446,063 | Cameron | July 27, 1948 |
| 2,536,613 | Schulze et al. | Jan. 2, 1951 |

FOREIGN PATENTS

| Number | Country | Date |
|---|---|---|
| 93,215 | Switzerland | Mar. 1, 1922 |
| 117,996 | Great Britain | Aug. 15, 1918 |
| 600,388 | Great Britain | Apr. 7, 1948 |